Nov. 2, 1948.                D. SULPRIZIO                 2,452,804
                         MACHINE CONSTRUCTION
                         Filed April 12, 1945
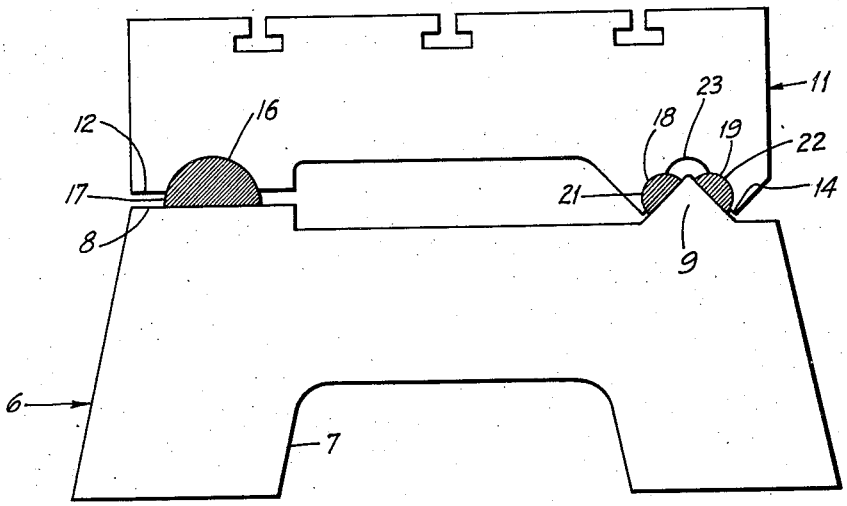
INVENTOR.
D. SULPRIZIO
BY
Robert A. Emhoff
ATTORNEY Patented Nov. 2, 1948

2,452,804

UNITED STATES PATENT OFFICE 2,452,804

MACHINE CONSTRUCTION

Deuta Sulprizio, Oakland, Calif.

Application April 12, 1945, Serial No. 587,957

2 Claims. (Cl. 308—3)

This invention relates to new principle and to improvements on the construction of machines and those mechanical devices in which one member is moved over a path while supported by direct contact with another member. Many examples of such construction can be given but for simplicity the invention will be described as it has been successfully employed in machine tool construction. It will be obvious, however, that the invention is not limited to this alone, being capable of wide application to any two elements to be engaged in a face-to-face support contact. Typical examples of machine tools to which the present invention relates are lathes, milling machines, planers, boring mills and the like wherein a tool or work-holding support is movable over the bed of the machine.

To insure accurate work it is essential that the relation between the tool or work-holder and the bed over which it is to be moved be constant irrespective of the position of the holder along the bed. To this end, the bed of such a machine and the surfaces on the holder to be engaged with the bed must first be cut with accuracy, the two being thereafter fitted together, the surfaces being filed or scraped to ensure a uniformity of position of the holder anywhere along the bed. This is a slow, tedious operation, necessarily expensive. When once fitted, undue wear or unintentional mechanical damage may subsequently mar the surface on one or the other of the elements involved so that the desired relationship is destroyed and necessitating refitting.

Initial inaccurate machine work or fitting of the parts, or unequal movement due to temperature variations between the parts, can result in the bearing load of one part on another being distributed unequally whereby undue and extremely rapid wear occurs with corresponding inaccuracy.

I have found that by providing a third element between the holder and the bed support surface, which element is movable within certain limits, the construction of, and the continued maintenance of the desired relationship between the two elements is materially simplified. For example, a semi-cylindrical rod is mounted in a suitable recess in a holder, the rod extending preferably in the direction of movement of the holder on the bed support. Instead of cutting or scraping the machine bed, for example, to insure the final finish, the operation is materially facilitated if one provides for the semi-cylindrical rod support between the bed and the holder for the rotational mounting of the semi-cylindrical member between the two insures equal pressure distribution between the bed and the holder. By replacing the rod, any wear can be readily corrected, the rod being made larger or altered in size to compensate for the wear which has occurred.

While I have mentioned a tool or work holder and a bed support, the rotatably mounted semi-cylindrical rod support can be provided between any two elements to support one element on another or base element with equal pressure application between the two while the surfaces of the support and the base are engaged and particularly during movement of one over the other.

It is in general the broad object of the present invention to provide an improved machine construction.

Another object of the present invention is to provide an improved mounting of a movable element on a support.

The invention includes other objects and features of advantage, some of which, together with the foregoing, will appear hereinafter. In the drawings accompanying and forming a part hereof, the single figure is an end view of a machine embodying a typical construction of this invention.

Referring to the drawing, a bed support 6 is shown as having support legs 7 and opposite guideway and support surfaces 8 and 9. Surface 8 is flat while surface 9 is in the form of a V projecting upwardly. A tool or work holder 11 is provided as the movable element. This is provided with flat surface 12 and a V cut 14, each positioned over bed flat 8 and bed V 9. In prior machines, surfaces 8 and 12, and the cooperating V projection and cut 9 and 14, would be fitted together with each in engagement with the other.

In accordance with this invention, holder 11 is formed with a semi-cylindrical recess 16 to receive the cylindrical portion of semi-cylindrical member 17 which is positioned with its flat face in engagement with flat surface 8. V cut 14 is formed with two semi-cylindrical recesses 18 and 19 and in each of these are mounted semi-cylindrical rods 21 and 22. The flat surfaces on each rod 21 and 22 are engaged with opposite sides of V projection 9. Rods 21 and 22 are independent of one another, groove 23 separating the two. One cannot utilize a single rotatable member formed with a V cut to engage V projection 9 since a single member does not provide the desirable independent movement. Each semi-cylindrical member should be rotatably mounted and should be rotatable in engagement with only one support surface.

The construction disclosed is typical of that useful for many machines and machine tools. Those skilled in the art can, without departing from the invention, employ it in any specific machine wherein one element slides over another.

I claim:

1. In combination, a machine element, a machine bed member having support surface thereon including a pair of plane surfaces arranged in such relation to each other as to form a V and providing a support for said machine element, and means for supporting said machine element on said pair of surfaces and comprising a pair of independent support members, each support member having a surface resting on and slideable over one of said pair of surfaces, said machine element having a semi-circular recess therein on each side of said V to receive a semi-circular portion on each of said support members and to support said members independently of one another.

2. In combination, a machine element, a machine bed member having a first support surface and a second support surface thereon extending in the same direction and providing a support for said machine element, said first support surface being substantially flat, said second support surface including a pair of plane surfaces arranged in such relation to each other as to form a V, means for supporting said element on said first support surface comprising a semi-circular recess in said element and a semi-circular support member mounted in said recess with the planar face on said member in engagement with the flat surface of said first support surface, and means for supporting said machine element on said second support surface and comprising a pair of independent support members, each support member having a surface resting on and slideable over one of said pair of surfaces, said machine element having a semi-circular recess therein on each side of said V to receive a semi-circular portion on each of said support members and to support said members independently of one another.

DEUTA SULPRIZIO.

REFERENCES CITED

The following references are of record in the file of this patent:

UNITED STATES PATENTS

| Number | Name | Date |
|---|---|---|
| 707,155 | Osgood | Aug. 19, 1902 |

FOREIGN PATENTS

| Number | Country | Date |
|---|---|---|
| 48,236 | Germany | 1889 |
| 369,855 | Italy | 1939 |